2,936,309
LOWER ALKYL ESTERS OF 1-(2′3′-DICHLORO-PROPYL)-4-CARBOXY-2-PYRROLIDONE

Abraham Bavley, Brooklyn, Charles J. Knuth, Flushing, and Bryce E. Tate, Kew Gardens, N.Y., assignors to Chas. Pfizer & Co., Inc., New York, N.Y., a corporation of Delaware No Drawing. Application April 29, 1958
Serial No. 731,644

3 Claims. (Cl. 260—326.3)

This invention relates to new and useful compounds which have been found to be efficient plasticizers for vinyl resin polymers. In addition to their function as plasticizing agents, the compounds of the present invention impart self-extinguishing properties to the vinyl resin polymers upon ignition even when relatively high proportions of such agents are used as plasticizers.

The novel compounds of this invention are lower alkyl esters of 1 - (2′,3′ - dichloropropyl) - 4 - carboxy-2-pyrrolidone, i.e., 1-(2′,3′-dichloropropyl)-4-carboalkoxy-2-pyrrolidone in which the alkoxy group contains from 1 to 4 carbon atoms.

The compounds of this invention may be prepared from the corresponding N-allyl pyrrolidone by direct chlorination in substantially quantitative yield. The N-allyl pyrrolidone precursors of the compounds of this invention may be prepared by reacting di-lower alkyl esters of itaconic acid and monoallyl amine by methods well known in the art, e.g., as illustrated in Examples I and III hereinafter.

The compounds of the present invention are high-boiling liquids which may be employed as plasticizers for vinyl resins, e.g., resins such as polyvinyl chloride and vinyl chloride-vinyl acetate copolymers, by incorporating them into the vinyl resin through the use of conventional means such as milling on a two-roll rubber mill. Particularly preferred plastic compositions of this type comprise the vinyl resin and the plasticizer in relative proportions of about 50 to about 90% of resin and from about 10 to about 50% of plasticizer. It will, of course, be apparent that other agents normally included in vinyl resin compositions may also be included in the vinyl resin compositions including a plasticizer of the present invention.

In addition to utility as a plasticizer for vinyl resins, the compounds of the present invention also display activity against *Hymenolepis nana*, a common helminth. Thus, 1-(2′,3′-dichloropropyl)-4-carbomethoxy - 2 - pyrrolidone demonstrates a remarkably high order of activity against this helminth at dosage levels as low as 300 mg./kg. of body weight of the animal treated without evidence of undesirable side effects.

The foregoing description of the present invention, and the examples appearing hereinafter, are for the purpose of illustration and are not limiting to the scope of the invention which is set forth in the claims.

Example I 1-allyl-4-carbomethoxy-2-pyrrolidone was prepared as follows: 62.7 g. (1.1 moles) of monoallyl amine was mixed with 158.0 g. (1 mol) of melted supercooled dimethyl itaconate at 20° C. A mildly exothermic reaction occurred, and the clear solution was cooled by immersion in an ice bath to maintain the temperature below 50° C. When the reaction had subsided (as evidenced by the cessation of the exotherm), the mixture was concentrated in vacuo to remove methanol by-product and excess amine. The concentrate was then distilled at a temperature of 120° C. and a pressure of 0.8 mm to obtain a 79% yield of liquid having a refractive index $n_D^{24.5}$ of 1.4829.

Example II

Preparation of the dichloro derivative of 1-allyl-4-carbomethoxy-pyrrolidone-2 was as follows: 20.0 g. (0.11 mol) of the product of Example I was dissolved in 100 ml. of carbon tetrachloride and the mixture cooled in an ice bath. When the solution had reached ice bath temperature, 8.4 g. (0.12 mol) of gaseous chlorine was bubbled through the solution, the temperature being maintained between 15° and 25° C. The carbon tetrachloride was removed under vacuum, and the oil which remained was heated for two hours at 35° C. and a pressure of 30 mm. The yield of this pale yellow oil was 28.0 g., 100% of theoretical. This oil could not be crystallized, nor could it be distilled without decomposition.

The analysis of this product was as follows: C, 39.03%; H, 4.84%. Calculated for $C_9H_{13}O_3NCl_2$: C, 42.2%; H, 5.16%.

Example III

When 1 mol dibutyl itaconate was substituted for the dimethyl ester in the preparative procedure set forth in Examples I and II, similar results were obtained and the corresponding butyl homolog, 1-(2′,3′-dichloropropyl)-4-carbobutoxy-2-pyrrolidone was produced. The product was a viscous oil which would not crystallize and could not be distilled without decomposition.

Example IV

Sixty-seven (67) parts by weight of a vinyl chloride-vinyl acetate copolymer (commercially available as Bakelite VYNW), 33 parts by weight of 1-(2′,3′-dichloropropyl)-4-carbomethoxy-2-pyrrolidone and 0.5 part by weight of stearic acid were blended together on a two-roll rubber mill at a temperature from about 130° C. to about 150° C. until the mix was homogeneous. On rolling into sheet form and cooling, a flexible extensible sheet of well-plasticized vinyl resin was obtained.

Example V

Sixty (60) parts by weight of a vinyl chloride-vinyl acetate copolymer (commercially available as Bakelite VYNW) and forty (40) parts of 1-(2′,3′-dichloropropyl)-4-carbobutoxy-2-pyrrolidone and 0.5 part by weight of stearic acid were blended together on a two-roll rubber mill at a temperature of about 130° C. to about 150° C. When the mix was homogeneous, it was rolled into sheet form and allowed to cool. A flexible, tough, extensible sheet of well-plasticized copolymer was obtained. The product of this example is self-extinguishing upon ignition as was the product of Example IV.

Example VI

The activity of 1-(2′,3′-dichloropropyl)-4-carbomethoxy-2-pyrrolidone against *Hymenolepis nana* was established as follows:

A significant number of mice were orally inoculated with the infectious ova of *Hymenolepis nana*. After a 14-day incubation, the helminth had developed to maturity and treatment was begun. Upon administering 300 mg./kg. of said pyrrolidone compound to the mice in three doses and holding for 48 hours after the last dose, the mice were sacrificed and the small intenstines examined for the presence of the tapeworm. This examination included use of a dissecting microscope to facilitate the detection of scolices. Each of the treated mice was found to be free of *Hymenolepis nana* infestation.

It is unexpected to find that the present pyrrolidone carboxylates containing as they do a high proportion of chlorine, are efficient plasticizers. The closely related 1-(2',3'-dichloropropyl)-4-carbo(2',3'-dichloropropoxy)-2-pyrrolidone shows no plasticizing action for vinyl chloride-vinyl acetate copolymers. The latter substance is prepared by chlorinating the allyl ester of 1-allyl-4-carboxy-2-pyrrolidone as described herein. The allyl ester is obtained by reaction of allyl amine with allyl itaconate in the fashion described in Example I.

What is claimed is:

1. 1 - (2',3' - dichloropropyl) - 4 - carboalkoxy-2-pyrrolidone wherein the alkoxy group contains from 1 to 4 carbon atoms.

2. 1 - (2',3' - dichloropropyl) - 4 - carbomethoxy - 2-pyrrolidone.

3. 1 - (2',3' - dichloropropyl) - 4 - carbobutoxy - 2-pyrrolidone.

References Cited in the file of this patent

UNITED STATES PATENTS 2,811,496     Knuth                Oct. 29, 1957